United States Patent [19]
Hebert et al.

[11] Patent Number: 5,906,097
[45] Date of Patent: May 25, 1999

[54] ENGINE FLOW CONTROL DEVICE

[75] Inventors: Leonard J. Hebert; Jerry Piro; Michael W. Su, all of Bellevue; Ronald L. Balzer, Bothell; Michael L. Sangwin, Kirkland; Jeff P. Lewis, Renton; Robert E. Moody, Carnation, all of Wash.

[73] Assignee: The Boeing Company, Seattle, Wash.

[21] Appl. No.: 08/825,827

[22] Filed: Mar. 29, 1997

[51] Int. Cl.⁶ .............................. F02C 7/20; F02K 3/02
[52] U.S. Cl. .................... 60/226.1; 60/223; 60/39.31; 244/53 R; 244/54
[58] Field of Search ................... 60/223, 226.1, 60/262, 271, 39.091, 39.31; 244/121, 130, 53 R, 54

[56] References Cited

U.S. PATENT DOCUMENTS

| | | |
|---|---|---|
| 3,101,920 | 8/1963 | Fradenburgh . |
| 3,175,791 | 3/1965 | Toms . |
| 4,427,169 | 1/1984 | Brown . |
| 4,466,587 | 8/1984 | Dusa et al. . |
| 4,712,750 | 12/1987 | Ridgwell . |
| 5,524,846 | 6/1996 | Shine et al. . |
| 5,623,820 | 4/1997 | Balzer et al. ................. 60/39.091 |
| 5,653,406 | 8/1997 | Amano et al. ................. 244/130 |

*Primary Examiner*—Charles G. Freay
*Attorney, Agent, or Firm*—Christensen O'Connor Johnson & Kindness PLLC

[57] ABSTRACT

A fencing assembly (66) for prohibiting circulation of primary and/or fan airflows (52), (54) into a bounded low pressure region of a jet engine installation. The fencing assembly includes one or more flow control fences. In an exemplary application, the fencing assembly includes a number of fences positioned around the sides of a batcave (48) bounded low pressure region that is located between a primary exhaust nozzle (20) and strut fairings (30). The fencing assembly includes five fences, each fence being connected to either the primary exhaust nozzle or the strut fairings. The five fences include single fences (70), (72) positioned along each lateral side of the batcave; two rear fences (74), (74') positioned circumferentially about rear regions of the batcave; and an arcuate fence (76) positioned near the two rear fences to form a half circle. The fences include a foot portion (78) and an upright portion (80).

17 Claims, 7 Drawing Sheets

ENGINE FLOW CONTROL DEVICE

FIELD OF THE INVENTION

The present invention relates to apparatus for aircraft engine nozzles, and more particularly, to apparatus for altering the aerodynamic characteristics of jet engine exhaust relative to bounded low pressure regions of the engine.

BACKGROUND OF THE INVENTION

In order to understand the nature of the present invention, it is helpful to first review various exhaust aspects of a turbofan jet engine. Below is a brief description of engine exhaust components and fire safety elements, followed by description of the airflow dynamics associated with these elements during use.

With regard to jet engine exhaust components, FIG. 1 is a forward-looking perspective rear view of a primary exhaust nozzle 20 and a primary nozzle plug 22 of a turbofan jet engine. The primary exhaust nozzle is generally positioned at the aft end of a gas generator (not shown). As illustrated in FIG. 2, the primary exhaust nozzle includes a nozzle outer sleeve 24 concentrically attached to a nozzle inner sleeve 26. The forward end of the nozzle inner sleeve is connected to the gas generator or to adjoining generator structure such as an engine turbine rear frame. An aft engine mount (portions of which are shown in FIG. 2 and labeled 28) is used to connect the engine to a support structure, e.g., an engine strut or pylon.

The support structure of FIG. 1 is a wing strut covered by various fairings and heat shields. Also shown in FIG. 1, and as referred to herein generically as "strut fairings" 30, is an aft cowl fairing 32, an aft cowl fairing heat shield 34, an aft fairing 36, and various heat shield castings 38. An annular core compartment vent exit 42 is formed by the space between the primary nozzle outer sleeve and the thrust reverser aft cowl 39 to vent engine core compartment air. In addition, there may be other outer structures, such as nacelle or thrust reverser components, positioned near the primary nozzle. Shown in FIG. 1 is a thrust reverser inner wall 35, a thrust reverser outer wall 37, a thrust reverser aft cowl 39, and a lower bifurcation panel 40. FIGS. 2–10 omit various of these other structures in order to show aspects and features of the present invention more clearly.

With regard to fire safety elements, a number of fire zones exist within the generator and at the primary nozzle that are designed in a manner that prohibits an engine fire from spreading. Of particular interest to the present invention is an aft mount fire zone located just behind the aft engine mount that extends over the upper 80 degrees of the primary nozzle. Commercial aircraft propulsion systems generally require each fire zone to include a fire seal that is capable of containing and isolating a fire, not only from other propulsion installation components (e.g., nacelles and engine fairings), but also from areas surrounding the propulsion installation (e.g., wings, fairings, and fuselage). In the case of the aft mount fire zone, a fire seal is located along an upper arcuate region of the nozzle and oriented to prohibit flame from spreading aft of the gas generator or outward to the surrounding structures.

The aft mount fire seal arrangement shown in FIGS. 2, 4, 5, and 8–10 is called a "turkey feather" fire seal 44. Referring to FIG. 4, the turkey feather fire seal consists of a circumferential sheet metal spring 46 formed of segmented steel "fingers" that are overlapped and attached to the primary nozzle outer sleeve forward edge. The turkey feather fire seal compresses against the lower surface of the aft cowl fairing heat shield and the thrust reverser aft cowl (and/or other structure depending on the installation configuration) when the propulsion system is fully installed. The metal spring is angled upward and then downward, in the rearward direction, to provide a solid barrier so that flame cannot pass to downstream locations. This fire seal thus protects the support structures, the strut fairings, the wing structures, the various fairings and shields, and the aircraft fuselage from fire emanating rearward from the gas generator. The fire seal thus forms a barrier across the upper area of the primary nozzle, roughly at the intersection of the nozzle outer sleeve forward edge and the aft cowl faring heat shield.

As shown best in FIG. 4, a region exists on the primary nozzle outer sleeve behind the aft mount fire seal. This region is termed the "batcave" 48. The forward end of the batcave is defined by the aft mount fire seal. Some installations include aerodynamic fairings, termed "batwings" 50 that laterally flank each side of the batcave 48. The aft end of the batcave is not physically bounded.

With regard to fan airflow dynamics, during engine operation the fan air 52 passes generally between the thrust reverser inner and outer walls (thrust reverser stowed), and over the exterior of the primary nozzle as shown in FIG. 3. When the fan air encounters the aft mount fire seal, some of the fan air separates and later converges downstream of the batcave 48. Thus, the fire seal acts as a bluff body.

Because of the geometry of nacelle and strut components and airflow dynamics, there exists differing pressure regions in the areas of the primary nozzle, the aft cowl and aft fairings. In particular, the strut bifurcated fan airflow 52 pressure is relatively high around the batwings, while the pressure in the batcave is relatively low since it is a base region that is somewhat protected from both the fan and primary airstreams 52, 54. In addition, a local high pressure region exists just aft of the primary nozzle exit plane due to primary gas flow impingement along the aft fairing heat shield surfaces.

The combination of the batwing and batcave pressure differences can turn the fan flow laterally. As shown in FIGS. 3 and 4, a portion of fan airflow (labeled 56) may enter the batcave by passing between the aft cowl fairing heat shield and the primary nozzle outer sleeve at the inner side edges of the batwings. This flow converges near the downstream end of the batcave raising the local pressure. The pressure differences can also turn primary airflow forward, into the batcave. A portion of primary exhaust (labeled 58) may enter the batcave by flowing forward through the batcave's unbounded aft end. This batcave pressure field together with the relatively lower pressure at the core compartment vent exit plane induces flow rotation. A steady state representation of the dynamic flow field in the region of the batcave is shown schematically in FIG. 4, the fairing heat shield being shown in phantom. The air entering the batcave has a tendency to enter the batcave sides and aft end, move forward within the batcave, and exit the batcave at its forward lateral corners.

It is the understanding of the present inventors that a phenomenon exists in which side-to-side out-of-phase oscillating pressure fields form and convect axially down the primary nozzle outer sleeve and the aft cowl fairing heat shield exterior surfaces. These pressure fields appear to result from vortex shedding 60 from the airflow coming from the forward lateral corners of the batcave 48. Referring to FIGS. 3 and 4, vortices 60 are formed from a dynamic issuance of the recirculating fan airflow (i.e., the portion entering the batcave lateral sides) and primary airflow (i.e., the portion entering the aft end of the batcave). These airflows exit the batcave with momentum sufficient to couple, amplify, and convect with the surrounding rearward-flowing fan airflow.

The combined batcave recirculation airflows are induced by the pressure fields associated with the gross geometric features of the primary nozzle, outer structures, and fairings, as well as induced by the operating conditions of the jet engine and the aircraft. The batcave vorticity and issuance have a characteristic frequency associated with the local geometry and fan airflow speed. Thus, the phenomenon is tied with the specific component dimensions of the installation, including the nacelle and strut structure geometry.

To the best of the inventors' knowledge, this phenomenon has not been positively identified nor solved prior to the inventors' discovery and solution. The inventors are aware that some other aircraft use flexible seals between the fairing heat shield edges and the primary nozzle outer sleeve in an effort to improve engine performance. Such seals may help prevent the phenomenon described above, but obscure the phenomenon's proper discovery and solution.

Because many current jet engine installations have bounded low pressure regions, such as a batcave, there are potentially many aircraft that would be susceptible to this phenomenon. In general, it is desirable to eliminate flow fluctuations and structural vibrations. Thus a need exists to prevent, eliminate, or at least minimize these fluid disturbances and vortex shedding in propulsion system installations. The present invention is directed to fulfilling this need.

SUMMARY OF THE INVENTION

The present invention provides a fencing assembly for prohibiting recirculation of primary and/or fan airflows in a bounded low pressure region of a jet engine installation. In general, a fencing assembly formed in accordance with the present invention includes one or more flow control fences positioned along one or more sides of a bounded low pressure region. Each fence is cross-sectionally shaped to include a foot portion and an upright portion. The foot portion is connected to one of the bounded low pressure region surfaces at one or more of the region's sides. The upright portion extends from the foot portion to prevent fluid from flowing into the bounded low pressure region.

When used to improve the air flow characteristics relative to a batcave bounded low pressure region, the fences are connected to, or integral with, a primary exhaust nozzle at locations surrounding and adjacent to the batcave. The fences may be alternatively connected to, or integral with, an upper bounding surface of an aft cowl fairing heat shield, in which case, the upright portion extends downward.

In accordance with aspects of this invention, a preferred embodiment of a fencing assembly formed in accordance with the present invention includes five fences. One fence is positioned along each lateral side of the low pressure area; two fences are positioned circumferentially about rear regions of the low pressure area; and an arcuate fence is positioned near the two rear fences to generally form a half circle. Depending on the installation, the fencing assembly is connected to the primary nozzle at a location positioned directly beneath the strut fairings. Should the batcave be flanked by batwings (i.e., panel members designed to minimize drag), the fences may be preferably connected to or formed from the batwing edges adjacent to the batcave.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is applicable to any location in a jet engine in which a bluff body is positioned in a fluid in a manner generally transverse to the direction of fluid flow. Therefore, as used herein, the term "bounded low pressure region" is defined as the region behind the bluff body. Upon encountering the bluff body, the fluid must negotiate a path around the body. Depending on the location of the bluff body, there may also be one or more side surfaces that further define the bounded low pressure region.

In general, the present invention is a fencing assembly 66 (FIG. 5) arranged to prohibit the formation and issuance of vortex shedding by eliminating the available paths by which fan and/or primary air can enter or be affected by a bounded low pressure region (e.g., the batcave 48). A fencing assembly formed in accordance with the present invention includes one or more flow control fences positioned near the bounded low pressure region at locations that block airflow circulation paths.

To illustrate the features of the present invention, a batcave is used in FIGS. 5–10 as exemplary of a bounded low pressure region. The aft mount fire seal acts as the bluff body. The batcave is further defined by an upper bounding surface (i.e., the aft cowl fairing heat shield) and a lower bounding surface (i.e., the nozzle outer sleeve). Though, not a part of the present invention, better results will be obtained overall if a designer practicing this invention additionally uses a nozzle that is vibration resistant.

Figure 1:
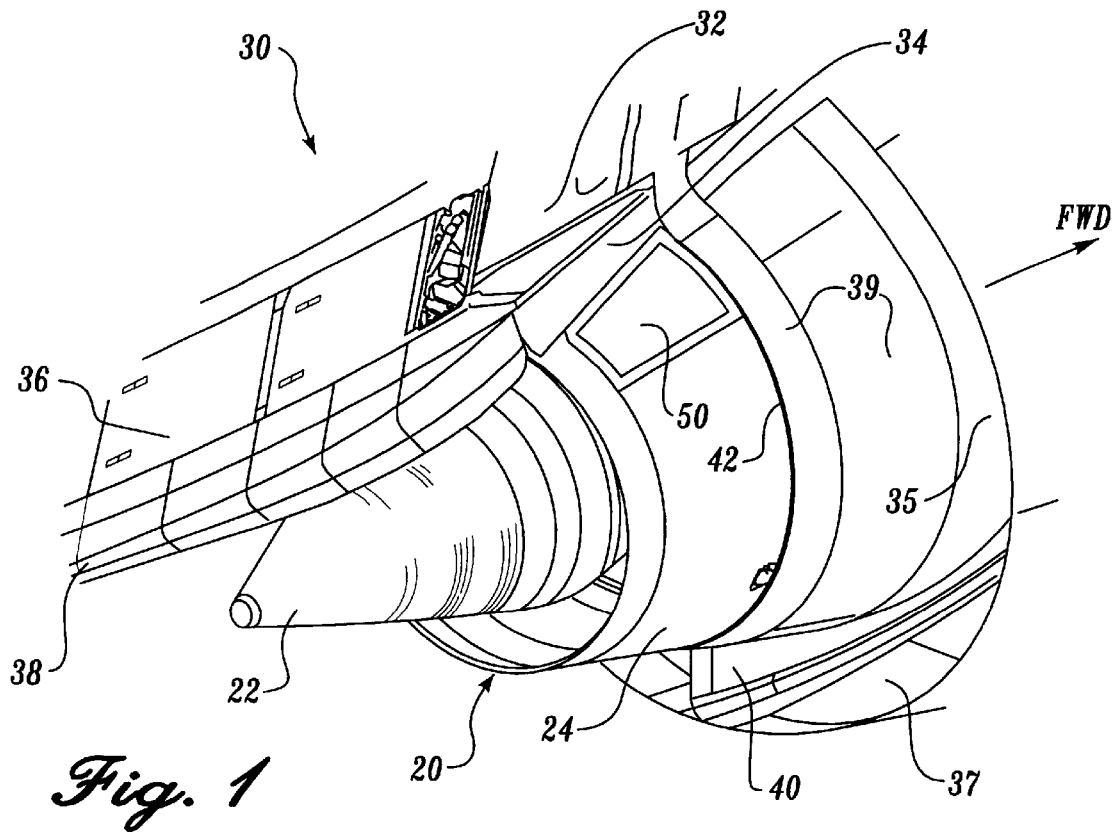
FIG. 1 is a forward-looking perspective view of rear portions of a high bypass ratio turbofan jet engine installation.
Figure 2:
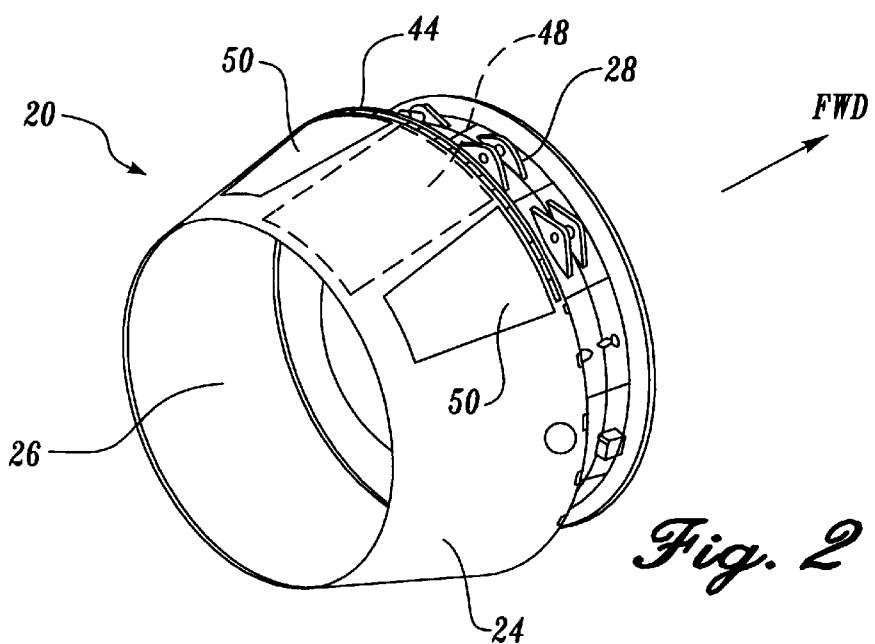
FIG. 2 is a perspective view looking forward of the primary exhaust nozzle of FIG. 1.
Figure 3:
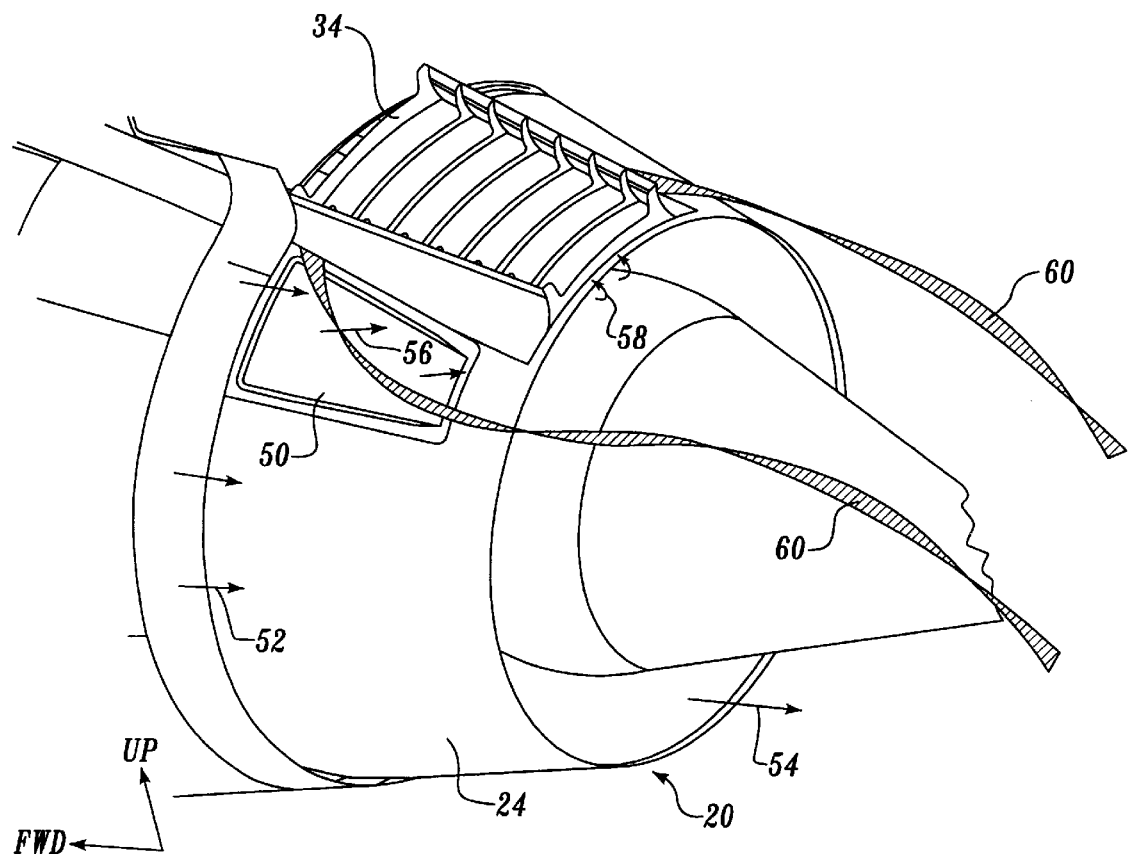
FIG. 3 is a forward-looking perspective view of the vortex shedding phenomenon created by an engine installation of the type shown in FIG. 1, with various installation components omitted for illustrative purposes.
Figure 4:
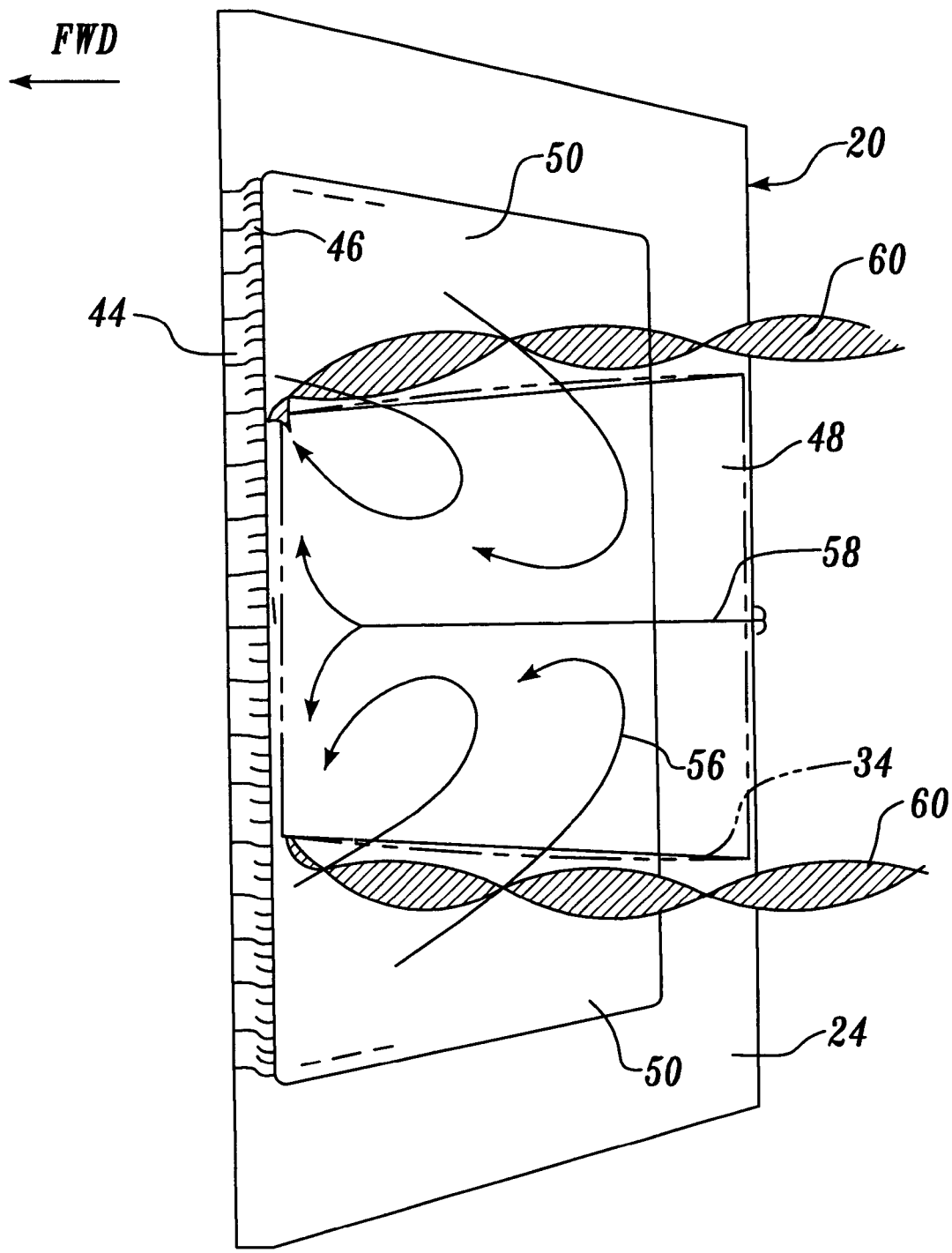
FIG. 4 is a plan view of the phenomenon of FIG. 3 with further components removed for illustrative purposes, the aft cowl fairing heat shield being shown in phantom.
Figure 5:
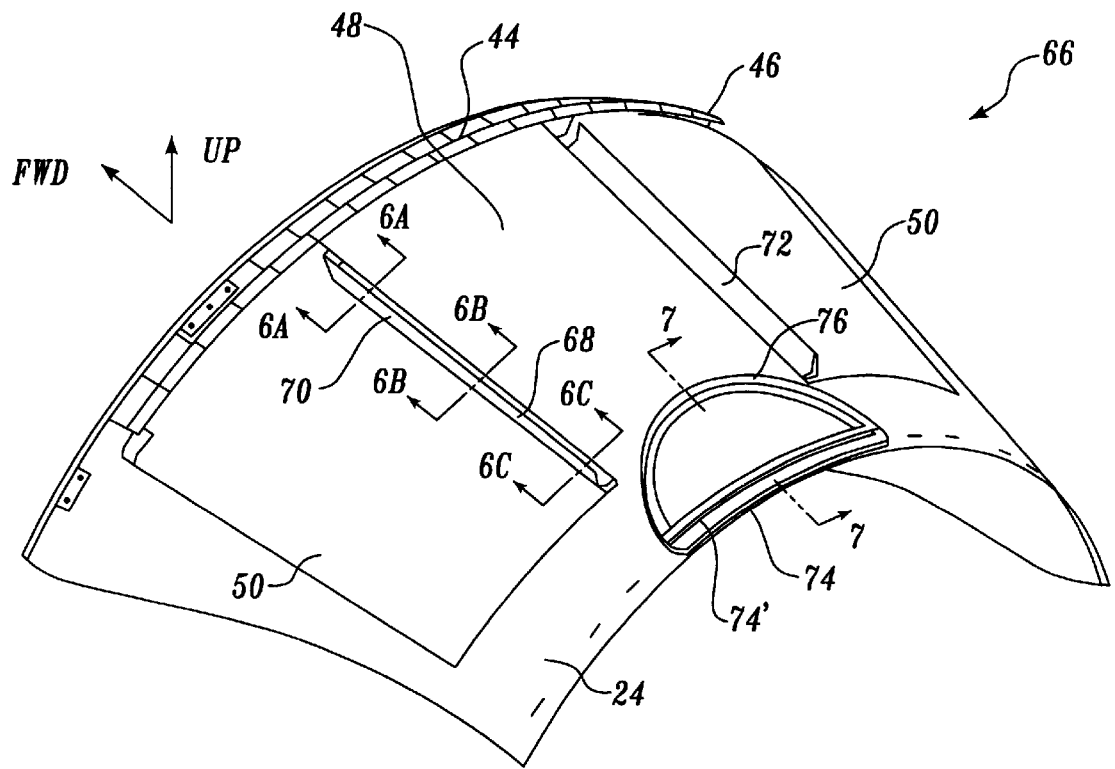
FIG. 5 is a forward-looking perspective view of a fencing assembly formed in accordance with the present invention.

A preferred embodiment of a fencing assembly 66 for use in a jet engine batcave is illustrated in FIGS. 5–10. In FIG. 5, the fencing assembly 66 includes a total of five flow control fences located in three different areas of the primary nozzle outer sleeve. A first fence 70 is positioned to the left-hand side (port side) of the batcave. A second fence 72 is positioned to the right-hand side (starboard side) of the batcave. The two side fences inhibit fan flow entrance into the batcave 48, thereby reducing air shedding from the batcave.

Two circumferentially curved aft fences 74, 74' are positioned at the rear of the batcave 48 at approximately the trailing edge of the primary nozzle, near the nozzle exit plane. The aft fences 74, 74' inhibit forward-flowing primary gases 58. The two aft fences 74, 74' are separated axially to decrease the amount and energy content of any primary flow entering the batcave. Lastly, a semicircular fence 76 is provided along a nozzle upper region that is forward of the two aft fences 74, 74'. The semicircular fence 76 is located near the aft fences to form a half circle. The diameter of the semicircular fence and the length of the two aft blade fences correspond approximately to the circumferential distance between the batcave side fences, as shown best in FIG. 10.

Referring back to FIGS. 5–7, the flow control fences are generally formed a foot portion 78 connected to the nozzle and an upright portion 80 extending normally outward from the foot portion 78. The fences may be formed of any one of various known materials. The material selected must be compatible with the material of adjoining components.

The fences are formed with a foot portion thickness in accordance with the installation environment. The thickness is not particularly critical, though, to the proper functioning of the fences. What is important is that the fences continue to be effective throughout the various aircraft flight segments and modes of engine operation. The foot portion 78 is generally about the same width as the upright portion, though, this will depend largely on the particular engine installation geometry. The height of the upright portion is selected to be that height which minimizes batcave mass flows and yet provides adequate mechanical clearance between the primary exhaust nozzle and the aft cowl heat shield in order to accommodate their relative motion during use. Alternatively, spring-like fences that are sufficiently pliable to allow fence-to-bounding-surface contact without loss of structural integrity may be used.

Figure 6A:
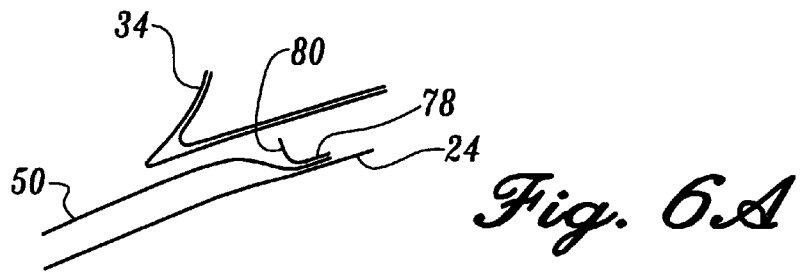
FIGS. 6A–6C are cross-sectional side views taken along lines 6A—6A, 6B—6B, and 6C—6C, respectively of FIG. 5.
Figure 6B:
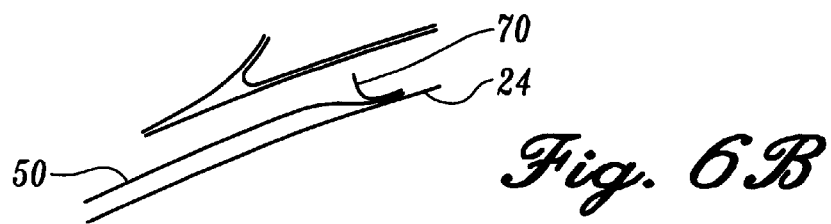
Figure 6C:
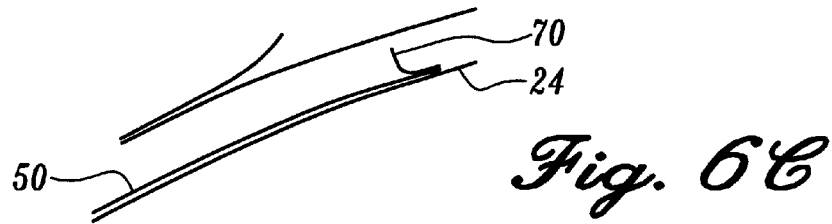
Figure 7:
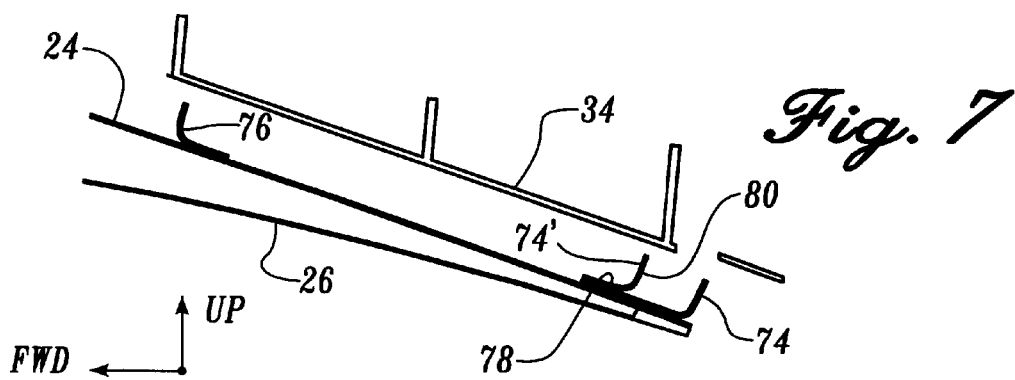
FIG. 7 is a cross-sectional side view taken along line 7—7 of FIG. 5.

Formation of the flow control fences is accomplished by bending, super plastic forming, molding, casting, forging, or any other available method. If formed separately, the fences are connected to the nozzle or fairings using any one of various known methods, e.g., riveted, bolted, welded, etc. The fence is shown oriented with the foot portion 78 placed inward (i.e., toward the batcave), although this aspect may change depending on the existing installation geometry. Referring to FIGS. 6A–6C, the left and right fences 70, 72 are located relative to the aft cowl fairing heat shield 34 such that the during use, the left and right fences are underneath and slightly inboard of the outer edges of the aft cowl fairing heat shield (or whatever cover or structure is at the location directly above the batcave 48).

Figure 8:
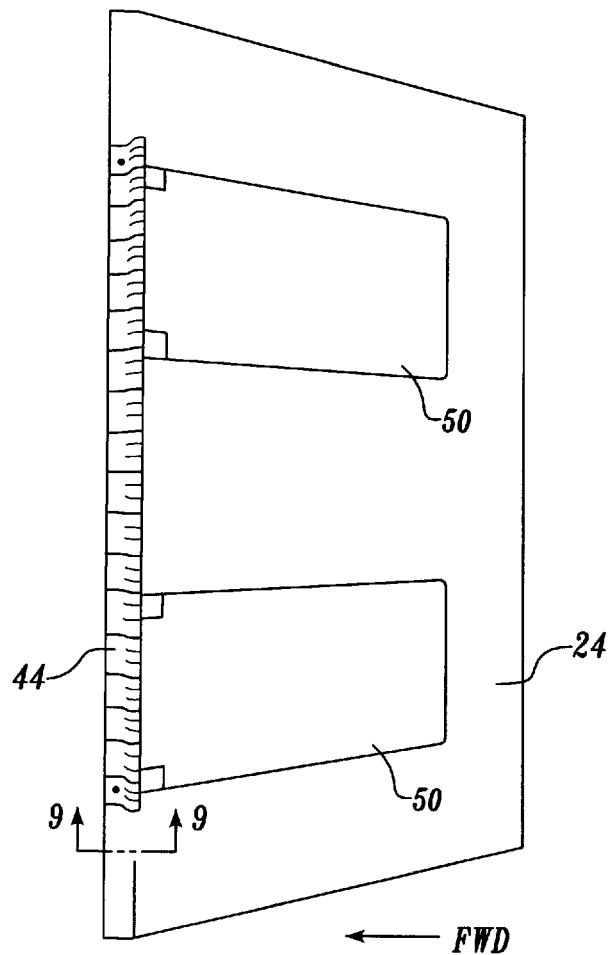
FIG. 8 is a plan view of batwings for use with the fencing assembly of FIG. 5.
Figure 9:
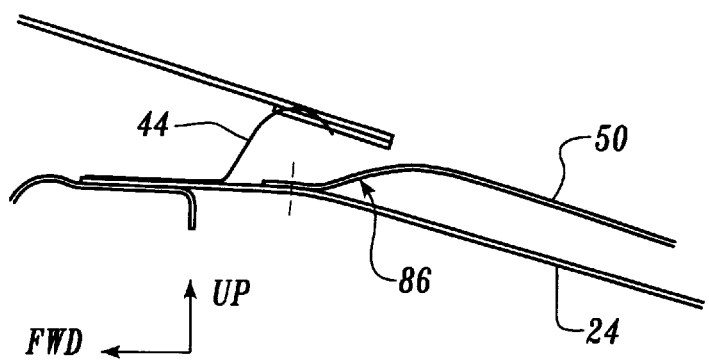
FIG. 9 is a cross-sectional side view taken along line 9—9 of FIG. 8.

Referring to FIGS. 8 and 9, this particular engine installation includes lateral batwings 50 having inboard lateral edges that are located close to the sides of the strut. The batwing leading edges 86 extend forward and are rounded to reduce the extent of local fan flow separation and to improve exhaust system performance. For this installation, each side fence is alternatively connected to or is formed from, and substantially runs the length of, the batwing longitudinal edge closest to the strut. Likewise, various other intermediate components may be present (e.g., a heat shield) to which the fence may be alternatively connected.

Figure 10:
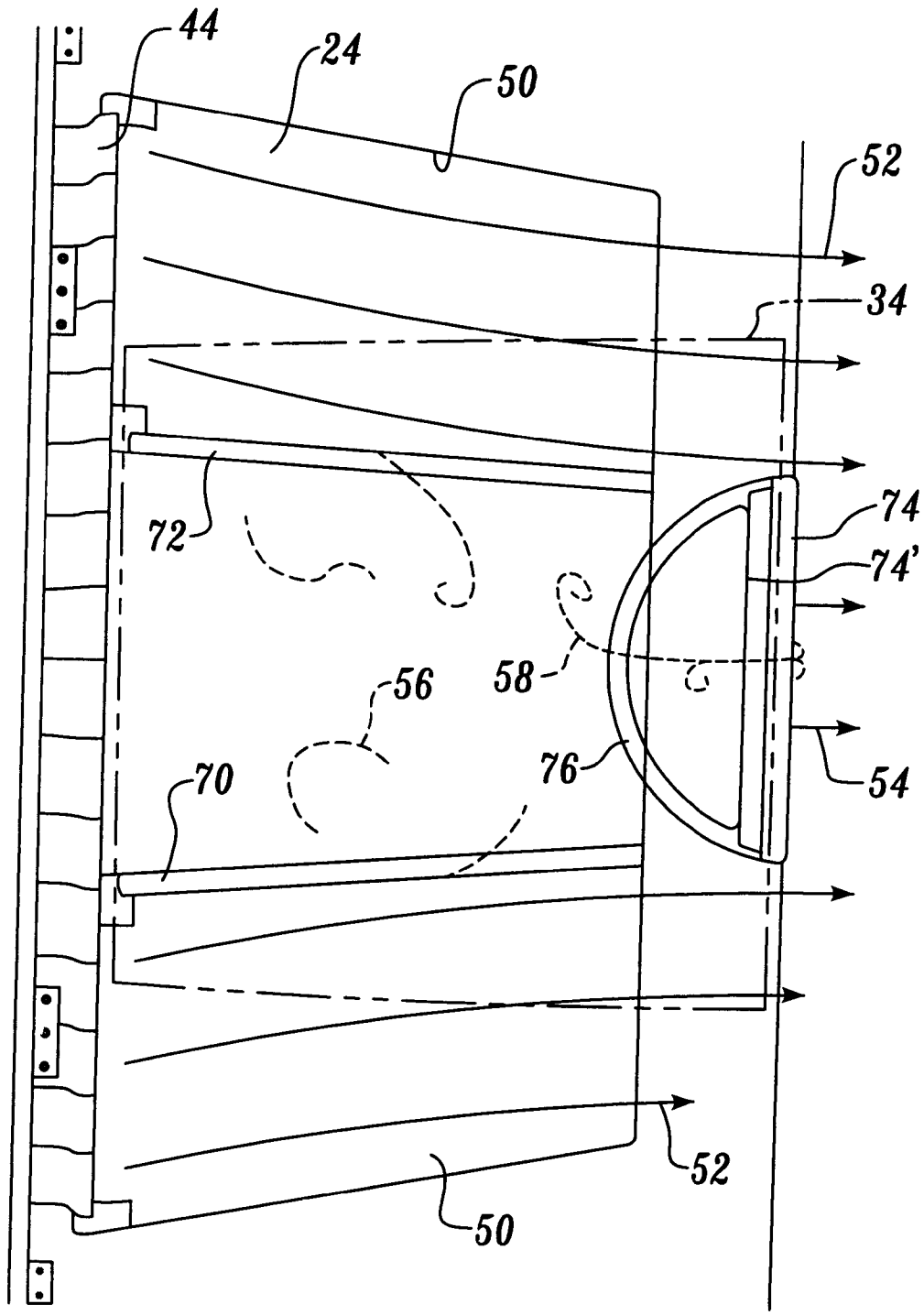
FIG. 10 is a plan view of the fencing assembly of FIG. 5 during use.

Air flow during use is indicated in FIG. 10, the aft cowl heat shield fairing being removed to show details of airflow in the batcave 48. The fencing assembly eliminates the oscillating pressure loads and instead produces rearward fan and primary airflows. Fan and primary airflows moving into and out of the batcave 48 are significantly reduced and, as a result, vortex shedding is eliminated.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a jet engine installation having engine exhaust that flows rearward along an exhaust path positioned adjacent to an airflow surface; the installation further including a bluff body positioned in the exhaust path to create a bounded low pressure region aft of the body; the improvement comprising a fencing assembly including at least one fence connected to the airflow surface; the fencing assembly guiding exhaust away from the bounded low pressure region.

2. The improvement according to claim 1, wherein the bounded low pressure region exists between upper and lower bounding side surfaces, wherein the fencing assembly includes at least two fences, at least one fence being positioned along each lateral side of the bounded low pressure region and connected to one of the upper and lower bounding side surfaces.

3. The improvement according to claim 1, wherein the at least one fence includes a foot portion and an upright portion, the foot portion being connected to or integrally formed with the airflow surface, the upright portion extending outward from the airflow surface.

4. In a turbofan jet engine installation including a batcave bounded low pressure region located between an exhaust nozzle and strut fairings, the improvement comprising a fencing assembly including at least one fence connected to one of the exhaust nozzle and the strut fairings, the fencing assembly prohibiting circulation of at least one of primary and fan airflows.

5. The improvement according to claim 4, wherein the fencing assembly includes two fences, one positioned along each lateral side of the batcave and a third fence positioned near the aftmost region of the batcave.

6. The improvement according to claim 4, wherein the fencing assembly includes an aft fence connected to the nozzle at a location near the aftmost region of the batcave.

7. The improvement according to claim 4, wherein the at least one fence includes a foot portion and an upright portion, the foot portion being connected to one of the exhaust nozzle and the strut fairings, the upright portion extending outward from the foot portion.

8. The improvement according to claim 4, wherein the nozzle includes batwings located adjacent to each lateral side of the batcave; wherein the at least one fence is connected to the batwing edge located nearest the batcave or formed from the batwing edge located nearest the batcave.

9. The improvement according to claim 4, wherein the low pressure area is a batcave located between an aft mount fire seal on a primary exhaust nozzle outer sleeve and an aft cowl fairing heat shield, wherein the fencing assembly is connected to the nozzle outer sleeve at locations positioned beneath and slightly inboard of the aft cowl fairing heat shield side edges.

10. The improvement according to claim 4, wherein the low pressure area is a batcave located between an aft mount fire seal on a primary exhaust nozzle outer sleeve and an aft cowl fairing heat shield, wherein the fencing assembly is connected to the lower surface of the aft cowl fairing heat shield.

11. In a turbofan jet engine installation including a batcave located on a primary exhaust nozzle, the improvement comprising a fencing assembly including a number of fences connected to the primary exhaust nozzle, the number of fences being positioned about the batcave in a manner to close off the batcave from at least one of primary and fan airflows, the number of fences each including an upright portion extending outwardly from the nozzle to directly block airflow circulation into the batcave.

12. A jet engine installation comprising:
   (a) a jet engine capable of producing engine exhaust;
   (b) a nozzle;
   (c) strut fairings, a bounded low pressure region existing between portions of the nozzle and the strut fairings; and
   (d) a fencing assembly for guiding engine exhaust away from the bounded low pressure region, the fencing assembly comprising at least one fence connected to one of the strut fairings and the nozzle, each fence having an upright portion extending in a manner to block exhaust from entering the bounded low pressure region.

13. The jet engine installation according to claim 12, wherein the fencing assembly includes five fences, one positioned along each lateral side of the bounded low pressure region, two positioned circumferentially about the nozzle at the rear of the bounded low pressure region, and an arcuate fence positioned near the two rear fences to generally form a half circle.

14. The jet engine installation according to claim 12, wherein the bounded low pressure region is a batcave on a primary exhaust nozzle and the nozzle includes batwings located adjacent to each lateral side of the batcave; wherein the at least one fence is connected to the batwing edge located nearest the batcave.

15. The jet engine installation according to claim 12, wherein the bounded low pressure region is a batcave on a primary exhaust nozzle and the nozzle includes batwings located adjacent to each lateral side of the batcave; wherein the at least one fence is connected to the strut fairings.

16. The jet engine installation according to claim 12, wherein the low pressure area is a batcave on a primary exhaust nozzle and the nozzle includes batwings located adjacent to each lateral side of the batcave; wherein the at least one fence forms the batwing inboard edge.

17. The jet engine installation according to claim 12, wherein the strut fairings include an aft cowl fairing heat shield, the nozzle includes a nozzle outer sleeve, and the low pressure area is a batcave located between the nozzle outer sleeve and the aft cowl fairing heat shield; wherein the fencing assembly is connected to the nozzle outer sleeve at locations positioned beneath the aft cowl fairing heat shield.

* * * * *

UNITED STATES PATENT AND TRADEMARK OFFICE
CERTIFICATE OF CORRECTION

PATENT NO. : 5,906,097
DATED : May 25, 1999
INVENTOR(S) : L.J. Hebert et al.

It is certified that error appears in the above-identified patent and that said Letters Patent is hereby corrected as shown below:

| COLUMN | LINE | ERROR |
|---|---|---|
| [22]<br>Pg. 1, col. 1 | Filing Date | "Mar. 29, 1997" should read --Mar. 28, 1997-- |

Signed and Sealed this

Fifth Day of October, 1999

Attest:

Q. TODD DICKINSON

*Attesting Officer*     *Acting Commissioner of Patents and Trademarks*